United States Patent

Vancamp et al.

[11] Patent Number: 5,901,634
[45] Date of Patent: May 11, 1999

[54] BEVERAGE BREWING APPARATUS

[75] Inventors: Raymond E. Vancamp, Reno, Nev.; Thomas I. Warne, Oakville, Canada

[73] Assignee: Bloomfield Industries Canada Ltd., Mississauga, Canada

[21] Appl. No.: 09/148,489

[22] Filed: Sep. 4, 1998

[51] Int. Cl.⁶ .............. A47J 31/00; A47J 31/10; A47J 31/34; A47J 31/42
[52] U.S. Cl. .............. 99/281; 99/285; 99/291; 99/293
[58] Field of Search .............. 99/485, 486, 468, 99/330, 279–285, 291, 293, 294, 299, 300, 307, 316, 516, 534; 219/490–492, 494, 497, 501, 505; 392/323, 324, 441, 480, 481, 467; 426/231, 433

[56] References Cited

U.S. PATENT DOCUMENTS

| | | | |
|---|---|---|---|
| 3,978,778 | 9/1976 | Roberts | 99/281 |
| 4,602,145 | 7/1986 | Roberts | 392/496 |
| 4,603,621 | 8/1986 | Roberts | 99/307 |
| 4,621,571 | 11/1986 | Roberts | 99/281 X |
| 4,650,158 | 3/1987 | Roberts . | |
| 4,739,697 | 4/1988 | Roberts . | |
| 4,809,594 | 3/1989 | Vitous | 426/433 X |
| 4,860,906 | 8/1989 | Pellegrini et al. | 99/280 |
| 5,285,718 | 2/1994 | Webster et al. . | |
| 5,303,639 | 4/1994 | Bunn et al. | 99/289 R |
| 5,372,061 | 12/1994 | Albert et al. | 99/281 |
| 5,375,508 | 12/1994 | Knepler et al. | 99/280 |
| 5,402,705 | 4/1995 | Bailleux et al. | 99/281 |
| 5,408,917 | 4/1995 | Lussi | 99/323.1 |
| 5,455,887 | 10/1995 | Dam | 219/492 X |
| 5,704,275 | 1/1998 | Warne | 99/281 |

*Primary Examiner*—Timothy F. Simone
*Attorney, Agent, or Firm*—Donald E. Hewson; Richard J. Mitchell

[57] ABSTRACT

An apparatus for brewing a selected quantity of a brewed beverage comprises a water heater tank having a heating element, a water supply line having an inlet valve and an outlet disposed within the water heater tank adjacent the bottom, a water level sensor mounted within the water heater tank to activate the inlet valve when the level of water within the tank is below a controlled water level, and a temperature control to maintain water in a region adjacent the controlled water level within a predetermined temperature range. A brew chamber retains product therein. Heated brew water passes through the product in order to extract flavor therefrom. The heated brew water passes from the brew chamber into the brewed beverage container. A heated brew water outlet is disposed in water dispensing relation to the brew chamber and has a brew water valve to control the flow of heated brew water therefrom. A heated by-pass water outlet is separately arranged away from the brew chamber and is disposed in direct water-dispensing relation to the brewed beverage container. The heated by-pass water outlet has a by-pass water valve to control the flow of heated by-pass water therefrom directly into the brewed beverage container. A microprocessor controls the operation of the brew water valve and the by-pass water valve. The heated brew water outlet and the heated by-pass water outlet are used to produce the selected quantity of the brewed beverage at a desired strength.

15 Claims, 5 Drawing Sheets

Fig. 1

Total Dump Valve (TotalSBrew)

BEVERAGE BREWING APPARATUS

FIELD OF THE INVENTION

This invention relates to apparatus for brewing a selected quantity of a brewed beverage, such as coffee or tea, and more particularly to such an apparatus for brewing a large quantity of a brewed beverage wherein a separate water by-pass mechanism is employed.

BACKGROUND OF THE INVENTION

In modern society, it is becoming increasingly common to purchase a brewed cup of coffee from a coffee shop, donut shop, restaurant, or the like, as opposed to brewing coffee at home. It is also known to brew hot tea or soup in a similar manner, using an automatic brewing apparatus. In order to attract and maintain business, it is extremely important to such establishments that they brew very high quality coffee consistently—in other words, time after time. It is also important to have available several blends of coffee brewed and ready to be purchased.

Further, it is necessary that coffee establishments be able to serve a large amount of coffee in a relatively short period of time, such as during peak consumption periods, and also randomly at other times. It is, therefore, desirable to be able to brew a relatively large amount of coffee, perhaps as much as sixty to eighty cups at once, and have this amount of coffee remain at a high level of quality for as long as possible. It is also desirable to do so with a minimum amount of equipment, so as to reduce capital costs, and so on.

When brewing coffee, the control of water, especially in terms of amount of water delivered to the coffee grounds, and the rate at which the water is delivered, is of paramount importance. In smaller coffee brewers, such as those that brew about ten to twelve cups into a glass carafe, good quality coffee may be brewed quite readily by merely passing a known amount of water through a known amount of coffee grounds, at a known rate.

However, it has been found that coffee brewed by small capacity brewers into glass coffee carafes tends to maintain an acceptable drinking quality, at least by present day high standards, for only about one-half hour, as the heating elements that keep the coffee hot tend to cause the coffee to degrade quickly. Also, brewing coffee in this manner, in small batches, is labor intensive and may be undesirably expensive to a coffee shop, donut shop, restaurant, and the like. It may therefore be desirable to have large amounts of coffee brewed at one time, which coffee remains fresh for as long as possible. It is also desirable to brew more than one blend of coffee so that various brews of coffee are available to a customer at any one time. In order to do this using a single brewing apparatus, a brewing system is used where large insulated containers receive a large amount of brewed coffee while in place in the brewing apparatus, and are then removed to a remote location for dispensing of the coffee. The insulated containers may be airpots or other insulated carafes of the sort noted in WARNE U.S. Pat. No. 5,704,275, issued Jan. 6, 1998. In many instances, the insulated containers are so-called satellite containers, of the sort described in ROBERTS U.S. Pat. No. 4,621,571, issued Nov. 11, 1986. The satellite containers generally include a low wattage heating element to help maintain the temperature of the coffee in the container at a desired dispensing and drinking temperature. The flavour degradation which occurs in glass carafes or decanters does not occur in insulated satellite containers.

Accordingly, it is quite desirable for coffee shops, donut shops, restaurants, and the like, to use larger capacity brewers. However, it has been found that in larger capacity brewers, such as those that brew perhaps sixty to eighty cups at once and which, accordingly, use a large amount of coffee grounds at once, that it is difficult to obtain a high quality of brewed coffee at various volumes for the following reasons:

Hot water must remain in contact with the coffee grounds long enough to extract the flavor from the coffee grounds. However, if the water remains in contact with the coffee grounds too long as it passes through, the water will extract a larger amount of coffee flavor than is necessary; and it will also tend to start leeching out acids, oils, and other undesirable constituents, which make the taste of the coffee unacceptable. This is due to the fact that all of the water passing through the coffee grounds passes through a greater amount of coffee grounds. In order to solve this problem, some prior art coffee brewing systems that brew large amounts of coffee, such as those used in coffee shops, donut shops, restaurants, and the like, use a by-pass outlet having a selectively operable valve mounted thereon. Such a system is also described in ROBERTS U.S. Pat. No. 4,621,571. The by-pass outlet is disposed above the edge of the brew chamber of the coffee brewer such that water emanating therefrom is received into a special by-pass channel in the brew chamber, which by-pass channel permits the water to flow down the outer structure inside the brew chamber without passing through the coffee grounds therein, and into a container below. The flow of water through the by-pass valves is adjustable to meet brewing requirements.

There are a number of problems associated with this particular by-pass arrangement, as described. For example, a special brew chamber structure is required, which adds to the cost of manufacture.

It is an object of the present invention to provide a hot water by-pass arrangement wherein the water emanating therefrom does not contact the brew chamber of the coffee brewer.

It is another object of the present invention to provide an apparatus for brewing a beverage wherein the correct temperature water is delivered to both a brew water outlet and a by-pass water outlet.

It is a further object of the present invention to provide an apparatus for brewing a beverage, wherein the brewed beverage is received into a removable and replaceable container, so as to permit continuous brewing, irrespective of consumption.

It is yet another object of the present invention to provide an apparatus for brewing a high quality brewed beverage that is brewed in various large volumes.

It is yet another object of the present invention provide an apparatus for brewing a first beverage and a second beverage concurrently.

Finally, a principal purpose of the present invention is to provide an apparatus for brewing a beverage, as described above, wherein the control of the brewing process and the bypass system, and thus the quality of the brewed product, is under the control of a microprocessor.

PRIOR ART

U.S. Pat. No. 4,621,571 to ROBERTS discloses a satellite coffee brewing system including a central brewing unit co-operative with a plurality of like satellite receptacle units for receiving hot coffee from the central brewing unit while positioned with the central brewing unit, and for storing and dispensing hot coffee while positioned with the central brew unit or a remote station. A siphon-type hot water system directs hot brewing water to a brew chamber that can discharge coffee in at least two different orientations so as to alternatingly fill satellite units arranged side-by-side at the central brewing unit. The central brewing unit includes a by-pass valve for directing a portion of hot water to by-pass the coffee grounds retained within the brew chamber.

U.S. Pat. No. 5,704,275 to WARNE discloses an electronic brew control system for a coffee brewer, which control system has a microprocessor used to control the overall process, including controlling the water temperature and precluding a double-brew cycle.

Two further ROBERTS patents, U.S. Pat. No. 4,603,621 and U.S. Pat. No. 4,650,158, both disclose a beverage making device that permits the careful control of heated water used for brewing a brewed beverage, such that the heated water is not too hot. A safety thermostat quickly detects excessive temperatures in a hot water container. An improved spray disk assembly distributes the water over the produce being brewed.

U.S. Pat. No. 5,285,718 to WEBSTER et al teaches a combination beverage brewer with cold water supply, wherein cold water is dispensed from a dual station coffee brewer. The cooling module used to provide chilled water generates heat that is used to initially heat the water used to brew coffee.

SUMMARY OF THE INVENTION

In accordance with one aspect of the present invention, there is provided an apparatus for brewing a selected quantity of a brewed beverage by delivering heated brew water to a product, and passing the heated brew water through the product in order to extract flavor therefrom, and subsequently dispensing the resulting brewed beverage into a brewed beverage container. The apparatus comprises a water heater tank having at least one controllable heating element, a water supply line having an inlet valve means and an outlet disposed within the water heater tank adjacent the bottom thereof, a water level sensor mounted within the water heater tank to activate the inlet valve means when the level of water within the tank is below a controlled water level, and a temperature control means operatively connected in temperature controlling relation to the at least one controllable heating element to maintain water in a region adjacent the controlled water level within a predetermined temperature range. A first brew chamber is provided for retaining the product therein, wherein heated brew water will pass through the product in order to extract flavor therefrom, and wherein the heated brew water subsequently will pass from the brew chamber into a first brewed beverage container. A first heated brew water delivery means is connected in water receiving relation to the water heater tank at the region adjacent the controlled water level, and terminates in a first heated brew water outlet disposed in water dispensing relation to the first brew chamber. The heated brew water delivery means has a selectively operable first brew water valve means to control the flow of heated brew water from the first heated brew water outlet into the first brew chamber. A first heated by-pass water delivery means is connected in water receiving relation to the water heater tank at the region adjacent the controlled water level, and terminates in a first heated by-pass water outlet disposed in direct water-dispensing relation to the first brewed beverage container. The first heated by-pass water delivery means is separately arranged away from the first brew chamber, and has a selectively operable first by-pass water valve means to control the flow of heated by-pass water from the first heated by-pass water outlet directly into the first brewed beverage container. A microprocessor control means is provided for controlling the operation of the first brew water valve means and the first by-pass water valve means. The first heated brew water delivery means and the first heated by-pass water delivery means are used to produce the selected quantity of the brewed beverage at a desired strength.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
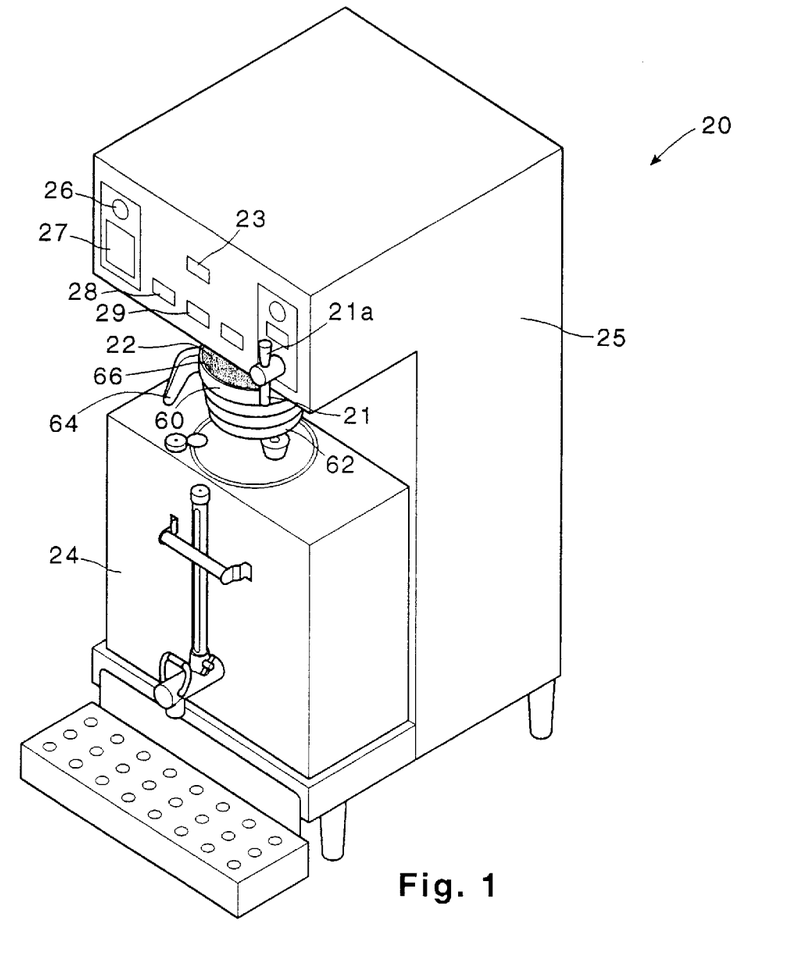
FIG. 1 is a perspective view from the front right of a first preferred embodiment of the apparatus of the present invention, for brewing selected quantities of a brewed beverage, with a satellite container in place.
Figure 2:
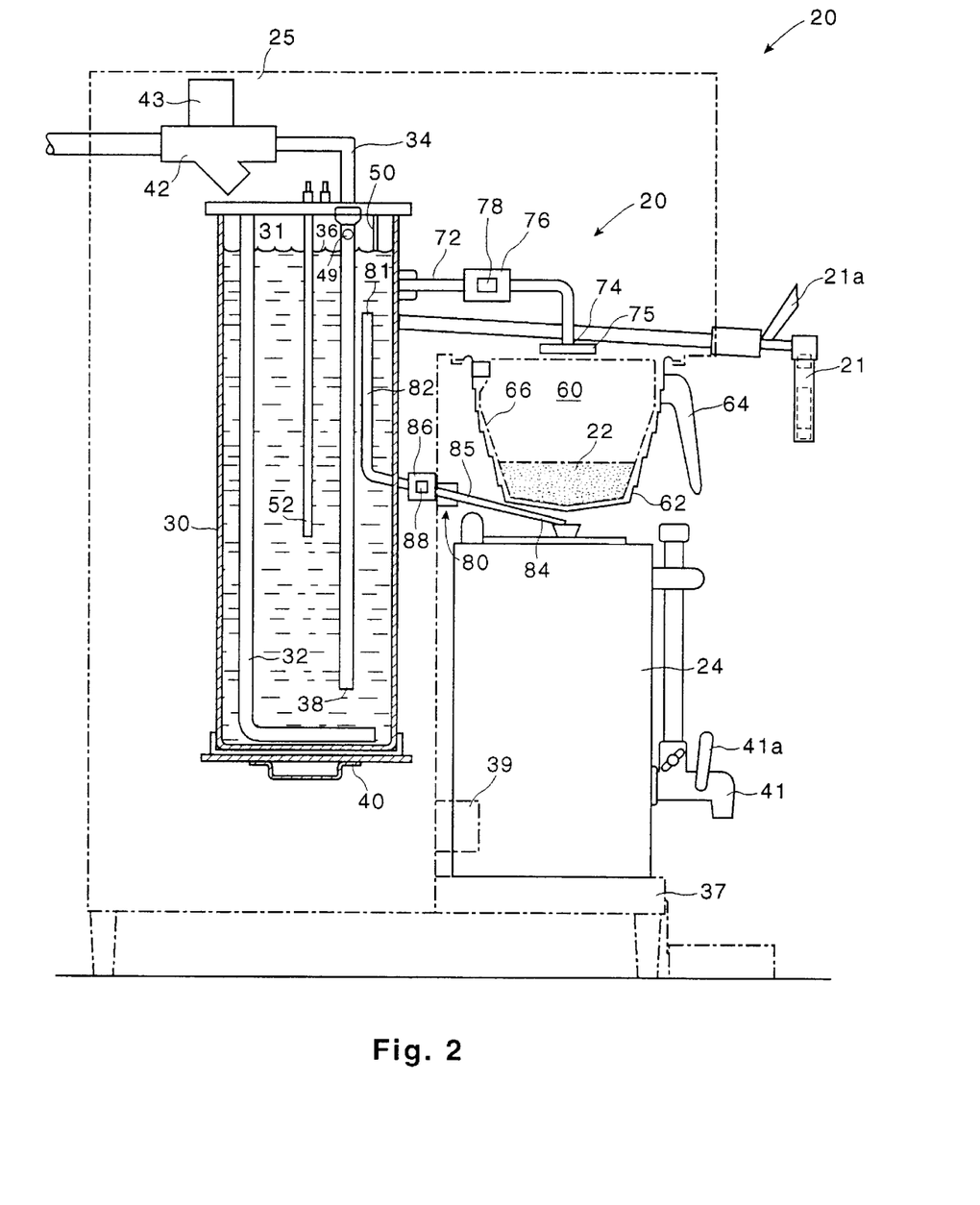
FIG. 2 is a side elevational view of the apparatus of claim 1, with the main body portion shown in ghost outline.

Reference will now be made to FIGS. 1 through 5 which show a first preferred embodiment of the present invention for brewing a selected quantity of a brewed beverage. The brewing apparatus, as indicated by the general reference numeral 20, brews a beverage by delivering heated brew water to a first product 22, which may be any one of various types of product, but would typically be coffee or tea. The heated brew water is passed through the first product 22 in order to extract flavor to the first product 22. Subsequently, the brewing apparatus 20, dispenses the resulting brewed beverage into a brewed beverage container, such as the satellite container 24, as is best seen in FIGS. 1 and 2. Further, the brewing apparatus 20 has a gravity-type hot water dispenser 21 operated by a handle 21a for obtaining hot water to be used in beverages such as hot chocolate, and so on.

The brewing apparatus 20 of the present invention comprises a main housing 25 that surrounds most of the components of the apparatus 20. A water heater tank 30 is mounted within the main housing 25 so as to preclude contact by a person with the water heater tank 30. The water heater tank 30 stores a substantial volume of water, perhaps eight to ten gallons, and heats the water to a desired temperature for subsequent dispensing. The water heater tank 30 has at least one controllable heating element. In the preferred embodiment as illustrated, there is one electrical heating element 32 which is suitably powered from an electrical source at 208 or 240 volts AC. Of course, there may be more than a single heating element, and the element or elements may be arranged for operation at other voltages. A water supply line 34 enters the water heat tank 30 above a controlled water level 36 and terminates in an outlet 38 disposed within the water heater tank 30 adjacent the bottom 40 of the water heater tank 30. The water supply line 34 has an inlet valve means 42, specifically a solenoid valve that is selectively openable and closeable by means of a solenoid 43, to control the flow of water into the water heater tank 30, as required. The water supply line 34 also includes an anti-siphoning aperture 44 therein disposed in the water supply line 34, one to two centimeters above the controlled water level 36. The anti-siphoning aperture 44 precludes the water 31 in the water heater tank 30 from being drawn in a reverse direction into the water supply line 34 in the event that the water pressure in the supply line 34 drops to a negative value.

A water level sensor 50 is mounted within the water heater tank 30 at the controlled water level 36. The water level sensor activates the inlet valve means 42—that is say that it activates the solenoid 43 of the inlet valve means 42 such that the inlet valve means 42 is open when the level of water 31 within the water heater tank 30 is below the controlled water level 36. The operation of the inlet valve means 42 may be under the control of a time delay programming step in a microprocessor which is discussed hereafter.

A temperature control means comprising a thermistor 52 is operatively connected in temperature controlling relation to the at least one electrical heating element 32 to maintain the water 31 in a region adjacent the controlled water level 36, typically a few centimeters or so from the controlled water level 36, within a predetermined temperature range. In this manner, a volume of water defined by the width and length of the water heater tank 30 and the depth of the region within the controlled temperature range, is sufficient for brewing an amount of brewed beverage to fill at least four—preferably, six or more—brewed beverage containers at the precise temperature required.

A first brew chamber 60 comprising an outer housing 62 with a handle 64 and an inner wire basket 66, is removably mounted in depending relation on the main housing 25 of the apparatus 20, so as to be disposed substantially immediately above a first brewed beverage container 24—generally, a satellite container 24. The first brew chamber 60 is for retaining the first product 22 therein. In use, heated brew water will pass through the first product 22 retained in the first brewing chamber in order to extract flavor from the first product 22. Subsequently, the heated brew water will pass from the first brew chamber 60 through an outlet 62 in the bottom of the first brew chamber 60, into the first brewed beverage container 24 where it resides as a first brewed beverage.

Generally speaking, the first product 22 is coffee grounds. However, the first product 22 might also be tea, since the same general principles apply to brewed tea and coffee—sufficient hot water must contact the product for at least a period of time so as to extract the flavour therefrom. Afterwards, the brewed product is passed to a suitable container for subsequent short term storage, dispensing, and consumption. The same conditions also apply for a variety of soups that have been specifically formulated so as to provide a soup beverage which is prepared in and dispensable from a brewing apparatus of the sort taught herein.

In keeping with the general principles of the present invention, the suitable container for short term storage, dispensing, and consumption of the brewed beverage is generally a heated satellite container 24. The satellite container 24 is a low wattage, internally heated, insulated storage container from which the brewed beverage may be dispensed from the dispenser 41 by operation of the handle 41a. The base 37 of the satellite container 24 is a non-heated base, for safety purposes. Generally, a pair of handles (not shown) is located at the top of each satellite container 24 for purposes of lifting and handling the container. A docking station connector 39 connects the satellite container 24 to the brewing apparatus 20, and as well the docking station connector 39 controls the operation of an interlock so that, unless a satellite container 24 is properly in place, no brewing operation can take place.

A first heated brew water delivery means, as indicated by the general reference numeral 70, comprises a tube 72 connected in water receiving relation to the water heater tank 30 at the region adjacent the controlled water level 36, typically about one to two centimeters below the controlled water level 36. The tube 72 terminates in a first heated brew water outlet 74 disposed in water dispensing relation to the first brew chamber 60, typically a short distance above the first brew chamber 60 and generally centrally disposed so as to permit substantially even distribution of the heated brew water throughout the first product 22 retained in the first brew chamber 60. In the preferred embodiment, as illustrated, the first heated brew water outlet 74 includes a disc-shaped spray head 75, which has a plurality of apertures therein, to permit substantially even distribution of the heated brew water over the first product 22. The first heated brew water delivery means 70 also has a selectively operable first brew water valve means comprising a solenoid valve 76 that is selectively openable and closeable by means of a solenoid 78, to control the flow of heated brew water from the first heated brew water outlet 74 into the first brew chamber 60.

A first heated by-pass water delivery means, as indicated by the general reference numeral 80, comprises a stand-pipe 82 connected in water receiving relation to the water heater tank 30, at a height several centimeters below the top of the water heater tank 30, and slightly below the first brew chamber 60. The stand-pipe 82 terminates in an open top end 81 disposed at the region adjacent the controlled water level 36, preferably about one to two centimeters below the controlled water level 36. The first heated by-pass water delivery means 80 further comprises a delivery tube 85 that terminates in a first heated by-pass water outlet 84 disposed in direct water-dispensing relation to the first brewed beverage container 24, and is preferably disposed below the first brew chamber 60 and above the first brewed beverage container 24. In any event, the first heated by-pass water delivery means 80 is separately arranged away from the first brew chamber 60, so as to not contact the first brew chamber 60 and, more importantly, such that the heated by-pass water emanating from the first heated by-pass water outlet does not contact the first brew chamber 60.

The first heated by-pass water delivery means 80 also has a selectively operable first by-pass water valve means comprising a solenoid valve 86, operatively disposed between the stand-pipe 82 and the delivery tube 85. The solenoid valve 86 is selectively openable and closeable by means of a solenoid 88, to control the flow of heated by-pass water from the first heated by-pass water outlet 84 directly into the first brewed beverage container 24, without contacting the first brew chamber 60.

Figure 3:
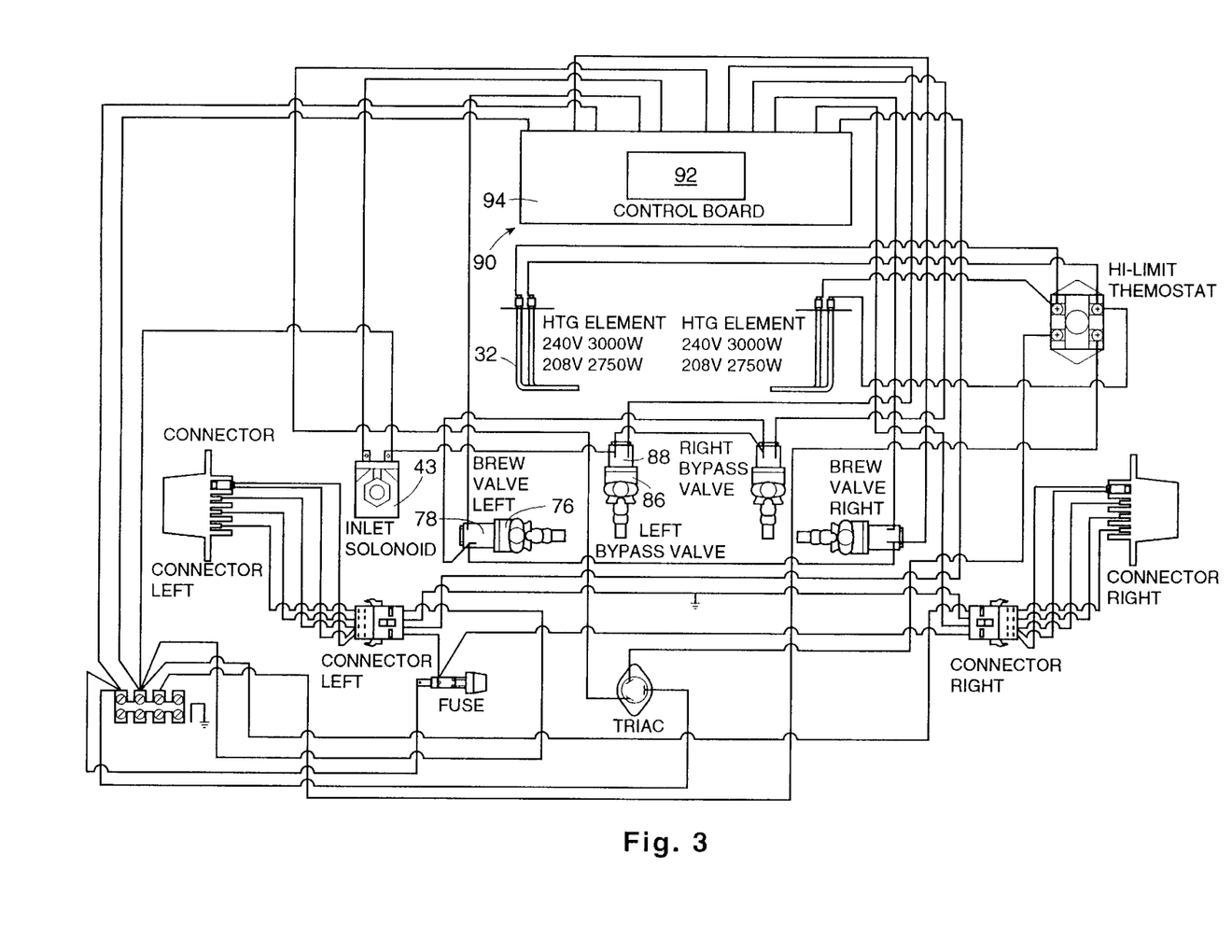
FIG. 3 is a schematic of the microprocessor based electrical control of the apparatus of FIG. 1.

A microprocessor control means, as indicated by the general reference numeral 90, comprises a microprocessor integrated circuit 92 mounted on an electrical circuit board 94, as can best be seen in FIG. 3. The microprocessor 92 is for controlling the operation of the first brew water valve means, specifically the solenoid 78 of the solenoid valve 76, and the first by-pass water valve means, specifically the solenoid 88 of the solenoid valve 86, so as to control the flow of heated brew water through the first product 22 disposed in the first brew chamber 60 and also to control the flow of the heated by-pass water that does not contact the first product 22 in the first brew chamber 60. In this manner, the first heated brew water delivery means 70 and the first heated by-pass water delivery means 80 are used to produce a selected quantity of the brewed beverage at a desired strength.

The microprocessor control means 90 further controls the operation of the electrical heating element 32 in conjunction with the temperature control means, namely the thermostat 52.

Further, the microprocessor control means 90 can selectively pulse the first brew water valve means 76 so as to produce an intermittent output from the first heated brew water delivery means 70, as will be described in greater detail subsequently.

Figure 4:
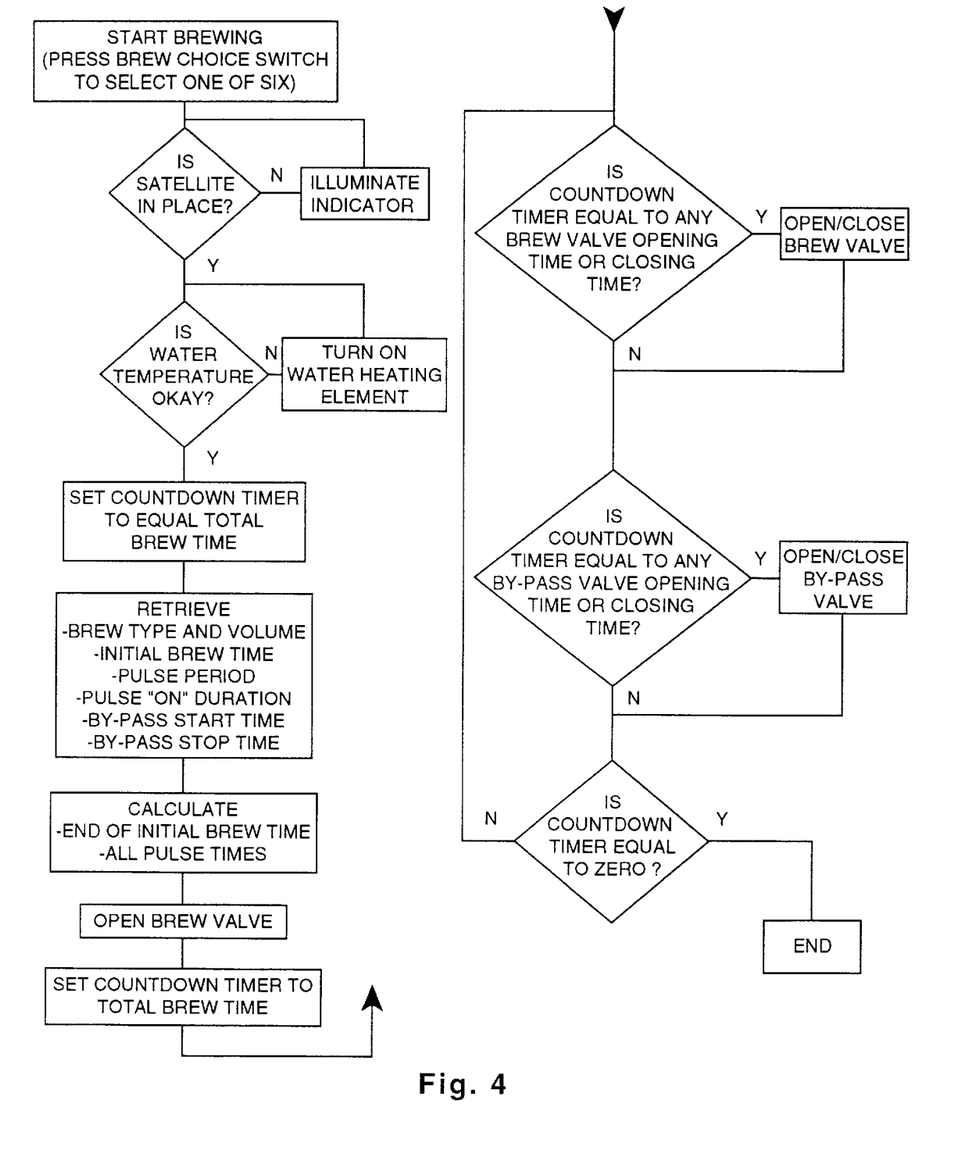
FIG. 4 is a flow chart of the basic logic used by the microprocessor of FIG. 3.

Reference will now be made to FIG. 4, to illustrate the basic operation of the beverage brewing apparatus 20 of the present invention. In order to start brewing, it is necessary to select the type of brewed beverage to be brewed. This selection is performed by pressing a "brew selector" button 26 disposed on the front of the main housing 25, which brew selector button 26 incrementally cycles through a choice of six brew choices. Those brew choices, in turn, translate to timing information for brewing each one of six particular brewed beverages. (Of course, the provision of six choices is strictly discretionary, and is used for purposes of this discussion. In fact, the number of choices may be as few as two or three, or more likely may be as many as twenty or more, depending on the memory capacity of the microprocessor being used.)

The brew choices are displayed on a visual display 27, typically an LCD screen, as the brew selector button 26 is used to select the type of brew. Each of the six brew choices stored in the memory associated with the microprocessor 92 represents different total brew times, initial brew times, pulse periods, and by-pass valve on-off times, which parameters are each for a particular type and volume of brew, and are determined through testing. The program to be executed by the microprocessor 92 and the timing information are contained in memory associated with the microprocessor 92 and are used by the microprocessor 92 to open and close the first brew water valve means and the first by-pass water valve means at predetermined times so as to brew a desired quantity of brewed beverage, as preselected. Once the appropriate brew choice has been selected by an operator, the "start brewing" button 28 may be pressed. Pressing the start brewing button 28 illuminates a visual indicator 29 to indicate that brewing is in process. The microprocessor 92 first checks that the first brewed beverage container 24, namely the satellite container 24, is in place. A suitable microswitch, proximity switch, or electrical contactor (none shown) may be used for this purpose. If the satellite container 24 is not in place, a visual indicator 23 is illuminated, and the program continues to loop until the satellite container 24 is in place—so that its docking station connector 39 is in place, and the associated interlock circuitry has disarmed a lock-out. Thus, once the satellite container 24 is in place, the brewing process can continue.

Next, the water temperature is checked by the thermistor 52 in the water heater tank 30. If the water in the region adjacent the controlled water level 36 is below a predetermined temperature range, the electrical heating element 32 is turned on and the program loops until the water temperature in the region adjacent the controlled water level 36 is within a predetermined temperature range.

The program then proceeds to set a countdown timer to a time value equal to the total brew time. The countdown timer typically tracks the number of seconds of the total brew and counts down, as controlled by an integrated circuit clock timer chip (not shown) on the electrical circuit board 94, to indicate the amount of time remaining in the overall brewing process (the total brew time). Next, various parameters are recalled from memory associated with the microprocessor 92, as chosen by the operator (one through six), and other parameters are calculated. The recalled and calculated parameters represent various time values during the duration of the overall brewing process, at which time values the first brew water valve means 76 and the first by-pass water valve means 86 will be opened and closed to delivery heated brew water and heated by-pass water, respectively, in order to properly brew the first brewed beverage as selected. These parameters include the volume of the brewed beverage, the initial brew time, all pulsing times, the by-pass valve open time and the by-pass valve close time.

Figure 5:
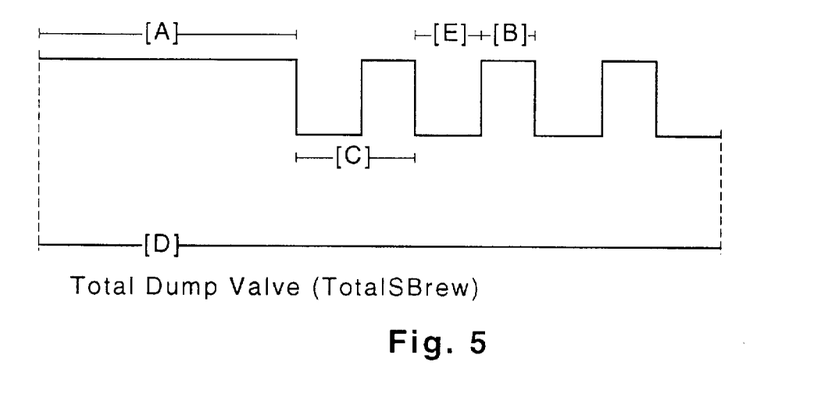
FIG. 5 is a time line graph of one possible operational signal sent to the brew valve during brewing of a beverage.

Reference will now be made to FIG. 5, which shows a time line over the total brew time "D". It can be seen that there is an initial brew time "A", during which time the brew valve is open, and subsequent pulse cycles, each having a time period "C", during each of the pulse cycles the first brew water valve means 76 is open for the latter portion of the pulse cycle for a duration "B". The first brew water valve means 76 is closed during the first portion "E" of the pulse cycles "C". The duration of "E" is calculated by subtracting the duration of "B" from the duration of "C". All of these various times are stored sequentially in memory so as to be used by the microprocessor 92 to open and close the first brew water valve means 76 and the first by-pass water valve means 86, as aforesaid, according to the countdown timer.

To actually start the physical brewing process, the total brew time is loaded into the countdown timer and concurrently the first brew water valve 76 is opened. The timer chip of the electrical circuitry then starts the countdown timer. The program being executed by the microprocessor 92 performs a loop that checks for first brew water valve means opening times and closing times and first by-pass water valve means opening and closing times, including an ending time of zero, and activates the solenoids 78, 88 of the respective valves 76,86 appropriately so as to open and close the first brew water valve means 76 and the first by-pass water valve means 86, as necessary.

It should be noted that the microprocessor 92 can also be programmed to open and close the first by-pass water valve means 86 independently of the overall brewing operation, in order to permit a predetermined amount of heated water to be dispensed from the first heated by-pass water outlet 84, without having to hold open a water faucet. This predetermined amount of heated water may be used to brew tea or to make soup, or for any other reason, and may be accessed when the satellite container 24 is not in place. However, it is necessary that the interlock circuitry associated with the docking station connector 39 must continue to be operative. Thus, either a safety clip may be put into place instead of the docking station connector 39; or other front panel control buttons may be provided to ensure functioning of the first by-pass water valve means 86 independently of the overall brewing operation, as described above.

Figure 6:
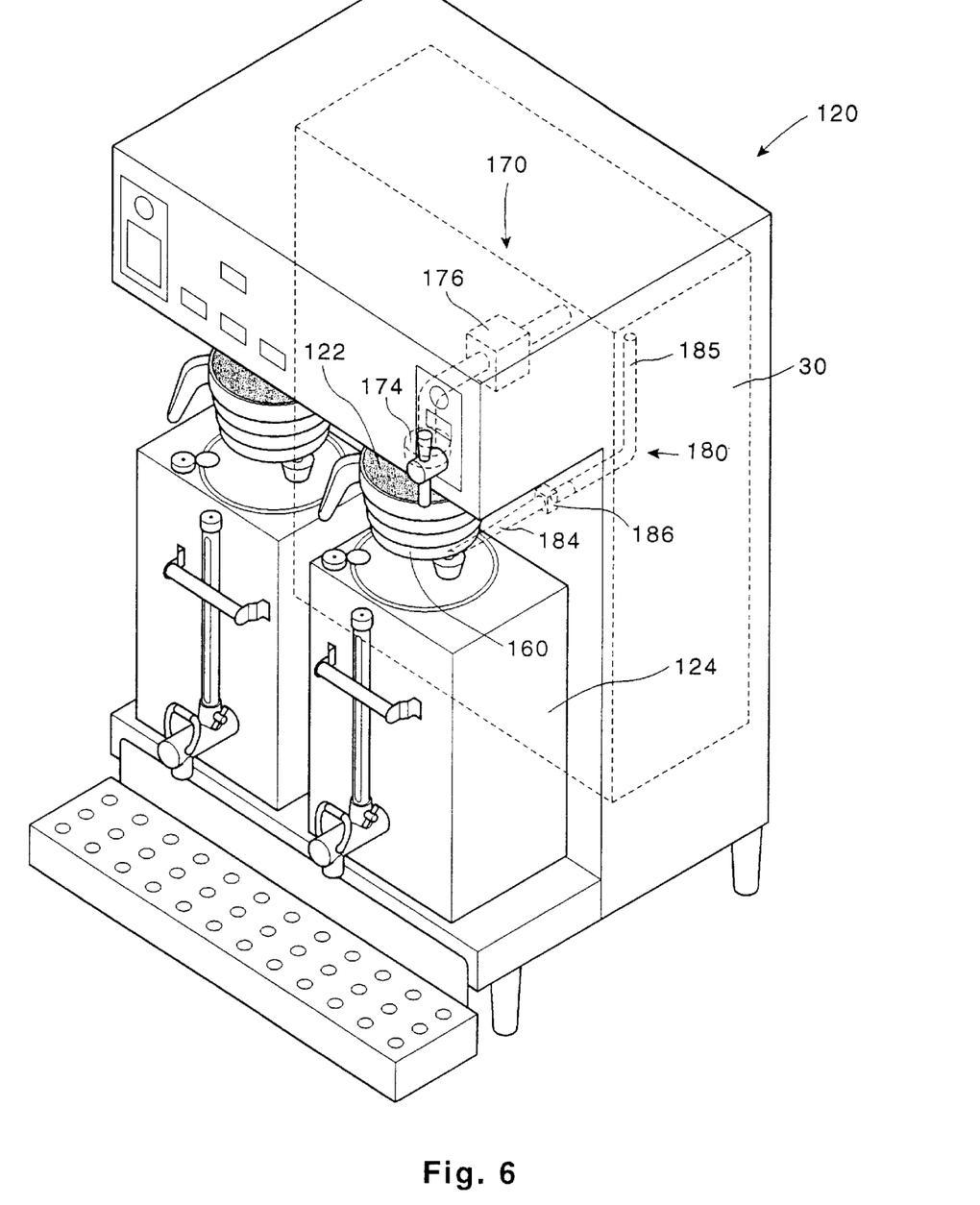
FIG. 6 is a perspective view of an alternative embodiment of the present invention, for brewing selected quantities of a brewed beverage.

Reference will now be made to FIG. 6, which shows an alternative embodiment of the present invention as indicated by the general reference numeral 120, wherein the apparatus 120 of the present invention is additionally arranged for brewing a selected quantity of a second brewed beverage by delivering heating brew water to a second product 122, which second product 122 typically is coffee or tea, and which typically may be different than the first product 22. Thus, each of the left and right sides of the apparatus essentially emulate each other, and have been annotated accordingly. However, there is only a single water tank 30, from which heated brew water will be drawn for passing into either satellite container 24 or 124.

Thus, each side operates independently one from the other, and may operate concurrently without affecting each other's operation. The heated brew water is passed through the second product 122 in order to extract the flavor therefrom, in manner similar to that described for the first preferred embodiment apparatus 20 and the first product 22 used therewith. Subsequently, the resulting second brewed beverage is dispensed into a second brewed beverage container 124, which typically is substantially identical to, or at least similar to, the first brewed beverage container 24. The alternative embodiment apparatus 120 uses the common water heater tank 30 used by the preferred embodiment apparatus 20, and as described above. Further, the alternative embodiment of the apparatus 120 of the present invention comprises a second brew chamber 160 disposed substantially immediately above the second brewed beverage container 124, for retaining the second product 122 therein. The heated brew water passes through the second product 122 in order to extract flavor therefrom. The heated brew water will subsequently pass from the second brew chamber 160 into the second brewed beverage container 124. A second heated brew water delivery means 170, as indicated by the general reference numeral 170, and similar to the first heated brew water delivery means 70, is connected in water receiving relation to the water heater tank 30 at the region adjacent to the controlled water level 36. In the alternative embodiment, as illustrated, the first heated brew water delivery means 70 and the second heated brew water delivery means 170 are separately and independently connected in water receiving relation to the water heater tank 30. Alternatively, they may be connected through a common passage. The second heated brew water delivery means 170 terminates in a second heated brew water outlet 174 disposed in water dispensing relation to the second brew chamber 160. A selectively operable second brew water valve means 176 comprising a solenoid valve is used to control the flow of heated brew water from the second heated brew water outlet 174 into the second brew chamber 160.

A second heated by-pass water delivery means 180 is connected in water receiving relation to the water heater tank 30 at the region adjacent to the controlled water level 36. Alternatively, or as well, the first heated by-pass water delivery means 80 and the second heated by-pass water delivery means 180 may be connected in water receiving relation to the water heater tank 30 through a further common passage (not shown). The second heated by-pass water delivery means 180 terminates in a second heated by-pass water outlet 184 disposed in direct water-dispensing relation to the second brewed beverage container 124, which second heated by-pass water outlet 184 is disposed below the second brew chamber 160 and above the second brewed beverage container 124. The second heated by-pass water delivery means 180 is separately arranged away from the second brew chamber 160, so as to not contact the second brew chamber 160, and such that water emanating from the second heated by-pass water outlet does not contact the second brew chamber 160.

A selectively operable second heated by-pass water valve means 186 comprising a solenoid valve is used to control the flow of heated by-pass water from the stand-pipe 185 and out the second heated by-pass water outlet 184 directly into the second brewed beverage container 124. The microprocessor 92 further controls the operation of the second brew water valve means 176 and the second by-pass water valve means 186, in a manner similar to that as described above, but completely independently of the first brew water valve means 76 and the first by-pass water valve means 86, such that the second heated brew water delivery means 170 and the second heated by-pass water delivery means 180 are used to produce the selected quantity of the selective brewed beverage at a desired strength.

Several specific features and advantages of the brewing system of the present invention further include the fact that the electronic control circuitry for the brewing apparatus, including particularly the microprocessor 92 and its associated circuitry, provide for built-in diagnostics. Thus, in the event of a failure of the brewing apparatus to operate in the intended fashion, it is possible that the operator may initiate a diagnostic process—by reference to an appropriate Operator's Manual—and determine what may have caused the failure. Generally, such circumstances may arise as a consequence of excessive use, or wear-and-tear, over a prolonged period of time of any of the functioning components of the brewing apparatus.

A quality timer light may be included in the front panel. Essentially, that light may be illuminated for a specific, predetermined period of time after a brewing process has been concluded; and, at the end of that predetermined period of time, the light would be extinguished, indicating that any remaining brewed beverage should be disposed of. Of course, the illumination of the quality timer light might be in the reverse; that is, the quality timer light might be arranged to turn on after expiry of a predetermined period of time, indicating that any remaining brewed beverage should be disposed of.

Because the present invention relies significantly on electronic microprocessor control, it is evident that, once the brewing apparatus has been set up, there should be no need to adjust the various flow control valves within the brewing apparatus by hand. Any adjustments that may be necessary, such as to accommodate various sizes of batches to be brewed, different beverages to be brewed, and so on, may simply be accommodated by appropriate microprocessor control.

The inventors herein have surprisingly noted that the present invention permits use of a smaller brew chamber 60 or 160 than has been used previously on other satellite brewing systems. Better extraction can be achieved. Also, the amount of coffee grounds that are used for any given batch size may, in fact, be decreased, thereby resulting in substantial savings to the operator while, at the same time, resulting in an improved brewed beverage. This is particularly accomplished because of the fact that very close control over the by-pass water system may be accomplished, and the size of the tube 72 may, in fact, be reduced because there is no longer any necessity to pass all of the water necessary for any single batch of brewed product through the brew chamber.

Other modifications and alterations may be used in the design and manufacture of the apparatus of the present invention without departing from the spirit and scope of the accompanying claims.

What is claimed is:

1. An apparatus for brewing a selected quantity of a brewed beverage by delivering heated brew water to a product, and passing said heated brew water through said product in order to extract flavor therefrom, and subsequently dispensing the resulting brewed beverage into a brewed beverage container, said apparatus comprising:

a water heater tank having at least one controllable heating element, a water supply line having an inlet valve means and an outlet disposed within said water heater tank adjacent the bottom thereof, a water level sensor mounted within said water heater tank to activate said inlet valve means when the level of water within said water heater tank is below a controlled water level, and a temperature control means operatively connected in temperature controlling relation to said at least one controllable heating element to maintain water in a region adjacent said controlled water level within a predetermined temperature range;

a first brew chamber for retaining said product therein, wherein heated brew water will pass through said product in order to extract flavor therefrom, and wherein said heated brew water subsequently will pass from said brew chamber into a first brewed beverage container;

a first heated brew water delivery means connected in water receiving relation to said water heater tank at said region adjacent said controlled water level, and terminating in a first heated brew water outlet disposed in water dispensing relation to said first brew chamber, and having a selectively operable first brew water valve means to control the flow of heated brew water from said first heated brew water outlet into said first brew chamber;

a first heated by-pass water delivery means connected in water receiving relation to said water heater tank at said region adjacent said controlled water level, and terminating in a first heated by-pass water outlet disposed in direct water-dispensing relation to said first brewed beverage container, said first heated by-pass water delivery means being separately arranged away from said first brew chamber, and having a selectively operable first by-pass water valve means to control the flow of heated by-pass water from said first heated by-pass water outlet directly into said first brewed beverage container; and microprocessor control means for controlling the operation of said first brew water valve means and said first by-pass water valve means;

wherein said first heated brew water delivery means and said first heated by-pass water delivery means are used to produce said selected quantity of said brewed beverage at a desired strength.

2. The apparatus of claim 1, wherein said first brew chamber is disposed substantially immediately above said first brewed beverage container.

3. The apparatus of claim 2, wherein said first heated by-pass water outlet of said first heated by-pass water delivery means is disposed below said first brew chamber and above said first brewed beverage container.

4. The apparatus of claim 1, wherein said water supply line enters said water heater tank above said controlled water level and terminates adjacent the bottom of said water heater tank.

5. The apparatus of claim 4, wherein said water supply line includes an anti-siphoning aperture therein.

6. The apparatus of claim 1, wherein said microprocessor control means further controls the operation of said controllable heating element in conjunction with said temperature control means.

7. The apparatus of claim 1, wherein said product is chosen from the group consisting of coffee, tea, and soup.

8. The apparatus of claim 1, wherein said microprocessor control means pulses said first brew water valve means so as to produce an intermittent output from said first heated brew water delivery means.

9. The apparatus of claim 1, which apparatus is additionally arranged for brewing a selected quantity of a second brewed beverage by delivering heated brew water to a second product, and passing said heated brew water through said second product in order to extract flavor therefrom, and subsequently dispensing the resulting second brewed beverage into a second brewed beverage container, said apparatus further comprising:

a second brew chamber for retaining said second product therein, wherein heated brew water will pass through said second product in order to extract flavor therefrom, and subsequently will pass from said second brew chamber into said second brewed beverage container;

a second heated brew water delivery means connected in water receiving relation to said water heater tank at said region adjacent said controlled water level, and terminating in a second heated brew water outlet disposed in water dispensing relation to said second brew chamber, and having a selectively operable second brew water valve means to control the flow of heated brew water from said second heated brew water outlet into said second brew chamber; and a second heated by-pass water delivery means connected in water receiving relation to said water heater tank at said region adjacent said controlled water level, and terminating in a second heated by-pass water outlet disposed in direct water-dispensing relation to said second brewed beverage container, said second heated by-pass water delivery means being separately arranged away from said second brew chamber, and having a selectively operable second heated by-pass water valve means to control the flow of heated by-pass water from said second heated by-pass water outlet directly into said second brewed beverage container;

wherein said microprocessor control means further controls the operation of said second brew water valve means and said second by-pass water valve means; and wherein said second heated brew water delivery means and said second heated by-pass water delivery means are used to produce said selected quantity of said second brewed beverage at a desired strength.

10. The apparatus of claim 9, wherein said first and second heated brew water delivery means are connected in water receiving relation to said water heater tank through a common passage.

11. The apparatus of claim 9, wherein said first and second heated by-pass water delivery means are connected in water receiving relation to said water heater tank through a common passage.

12. The apparatus of claim 9, wherein said second brew chamber is disposed substantially immediately above said second brewed beverage container.

13. The apparatus of claim 12, wherein said second heated by-pass water outlet of said second heated by-pass water delivery means is disposed below said second brew chamber and above said second brewed beverage container.

14. The apparatus of claim 9, wherein said second product is chosen from the group consisting of coffee, tea, and soup.

15. The apparatus of claim 9, wherein said microprocessor control means further pulses said second brew water valve means so as to produce an intermittent output from said second heated brew water delivery means.

* * * * *